United States Patent [19]
Rouet et al.

[11] Patent Number: 6,061,072
[45] Date of Patent: May 9, 2000

[54] METHOD AND APPARATUS FOR CREATING LIFELIKE DIGITAL REPRESENTATIONS OF COMPUTER ANIMATED OBJECTS

[75] Inventors: Christian Rouet, San Rafael; Cary Phillips, Moss Beach, both of Calif.

[73] Assignee: Lucas Digital, Ltd., San Rafael, Calif.

[21] Appl. No.: 09/128,876

[22] Filed: Aug. 3, 1998

Related U.S. Application Data

[63] Continuation of application No. 08/566,051, Dec. 1, 1995, Pat. No. 5,818,461.

[51] Int. Cl.[7] .................................................. G06T 15/70
[52] U.S. Cl. ......................... 345/473; 345/474; 345/475; 345/419
[58] Field of Search .................................. 345/473, 474, 345/475, 419

[56] References Cited

U.S. PATENT DOCUMENTS

| | | | |
|---|---|---|---|
| 5,818,461 | 10/1998 | Rouet et al. ............................ | 345/473 |
| 5,854,634 | 12/1998 | Kroitor ................................... | 345/473 |
| 5,883,638 | 3/1999 | Rouet et al. ............................ | 345/473 |

Primary Examiner—Mark R. Powell
Assistant Examiner—Kimbinh T. Nguyen
Attorney, Agent, or Firm—Irell & Manella LLP

[57] ABSTRACT

The present invention provides methods and apparatus for creating lifelike digital representations of three-dimensional objects. Steps and means are described by which an animator may efficiently select and combine a plurality of animated objects to generate a new animated objects. According to the present invention, an animator may store a plurality of object shapes. To minimize storage, all of the object shapes are stored solely as differences from a base object. To form a new object, an animator may select from the database a number of objects with the desired characteristics and these objects will be blended with one another to create a new object with features that are a combination of the selected objects. The extent to which a selected object is incorporated into the new object may be selected by the animator by assigning each selected object with a weight. The new object is then a sum of each of the differences between each of the selected objects and the base object multiplied by their respective weights. The present invention also includes an improved graphical user interface for animating facial objects.

5 Claims, 3 Drawing Sheets

METHOD AND APPARATUS FOR CREATING LIFELIKE DIGITAL REPRESENTATIONS OF COMPUTER ANIMATED OBJECTS

This is a continuation of application Ser. No. 08/566,051, filed Dec. 1, 1995, now U.S. Pat. No. 5,818,461.

FIELD OF THE INVENTION F

The present invention relates to computer graphics techniques for creating lifelike digital representations of computer animated objects.

BACKGROUND OF THE INVENTION

Animating complex images, such as human or animal faces, that change frequently and subtly, is amongst the most difficult tasks that computer animators confront. Prior art techniques provide for the modelling of a face as a collection of polygons or bicubic patches, the shapes of which may be altered by control points. See, for example, U.S. Pat. No. 4,276,570 entitled "Method and Apparatus for Producing an Image of a Person's Face at a Different Age," to Burson et al. The face may then be changed by moving the control points. Further changes to the face, such as details that are not captured by the polygons or mesh, may be manually painted on the face using off the shelf painting software. This additional painting is a time consuming and tedious task.

One technique for assisting an animator to create faces entails storing a database of face positions and allowing the animator to blend selected face positions by selecting a weight for each position ("blended database entry"). Current software packages that implement this technique, however, tend to be relatively slow and have user interfaces that are not optimal. The present invention improves the art by providing a faster and more efficient blended database entry animation system in conjunction with an improved user interface.

SUMMARY OF THE INVENTION

The present invention provides methods and apparatus for creating lifelike digital representations of three-dimensional objects. Steps and means are described by which an animator may efficiently select and combine a plurality of animated objects to generate a new animated object. According to the present invention, an animator may store a plurality of object shapes. To minimize storage, all of the object shapes are stored solely as non-zero differences from a base object.

To form a new object, an animator may select from the database a number of objects with the desired characteristics and these objects will be blended with one another to create a new object with features that are a combination of the selected objects. The extent to which a selected object is incorporated into the new object may be selected by the animator by assigning each selected object a weight that may be altered as a function of time. That is, the weight is "animatable." The new object is then a sum of each of the differences between each of the selected objects and the base object multiplied by their respective weights:

$$\sum_{i \in selectedfaces} w_i(P_i - P_{rest})$$

An improved graphical user interface allows the animator to efficiently store, retrieve, display and select the weights for particular objects.

In the preferred embodiment, to increase speed, faces that are created as a mesh of bicubic patches are converted into a polygonal mesh and the blending is performed in the polygonal representation. The polygonal mesh is then rendered and displayed. Progressive 3D display is performed by switching between various resolutions of the polygonal mesh (for example, between mouse dragging and button release).

DETAILED DESCRIPTION OF THE INVENTION

Basic Architecture

Figure 1:
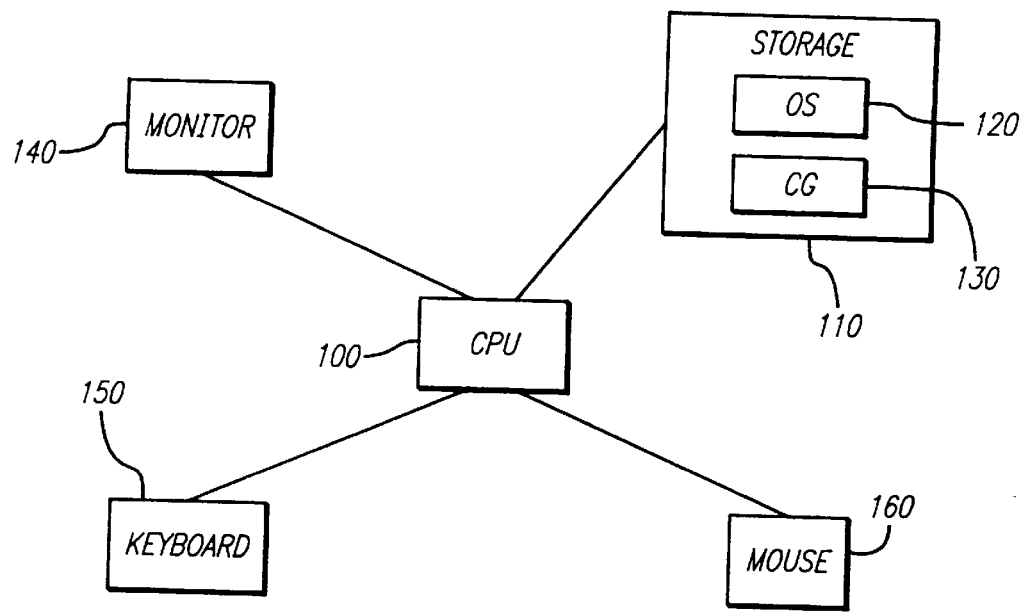
FIG. 1 provides a general illustration of preferred computer apparatus for implementing the present invention.

FIG. 1 depicts the general architecture of a digital computer system for implementing the present invention. Processor 100 is a standard digital computer processor, preferably a workstation-class processor such as Silicon-Graphics Indigo2-Extreme for interactive work, or Silicon-Graphics Challenge Servers for Batch Processing, running preferably the IRIX5.3 operating system. Although the processor 100 is shown as one unit, it will be appreciated that separate processes may be employed for interactive use and batch processing. System software 120 is stored on storage unit 110, e.g., a standard internal fixed disk drive. Also preferably stored on storage unit 110 is computer graphics ("CG") software 130 which, in accordance with the present invention, performs the tasks of modelling as described in greater detail below. Interactive user input, where referenced below, is provided via standard input peripherals such as keyboard 150 and/or mouse 160. Graphical output created by processor 100 under control of CG software 130 is transmitted to video monitor 140 for display to users; equivalently, output may also be transmitted to a printing devices to generate hard copy output in the form of videotape, film, slides, or the like.

Methodology

Figure 2:
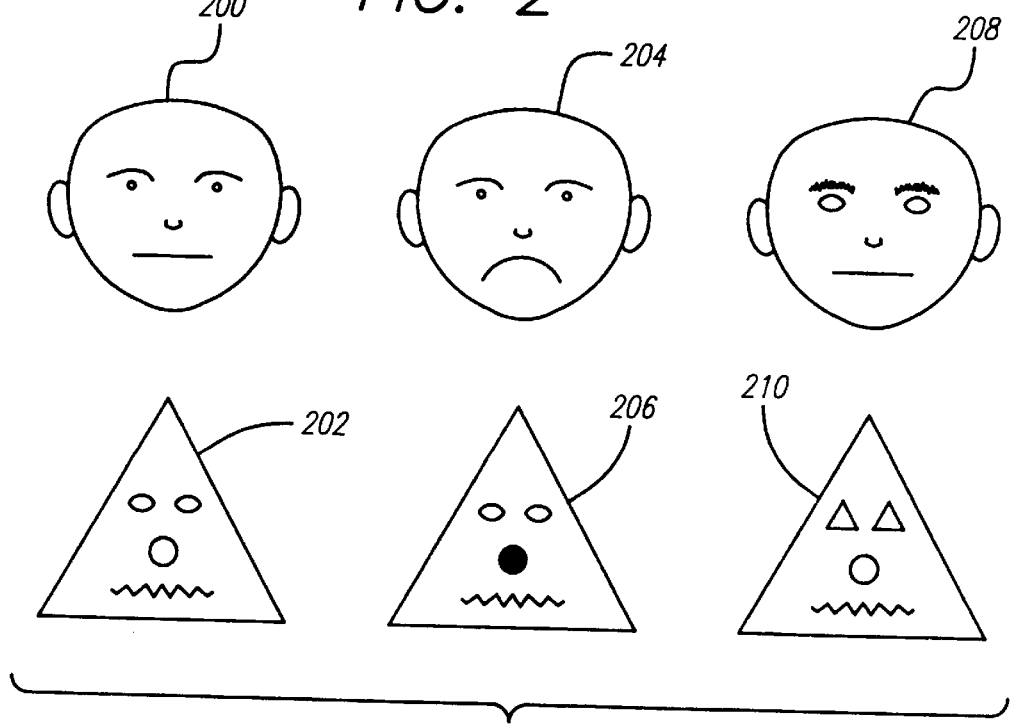
FIG. 2 illustrates a plurality of face shapes that may be stored in a database.

According to the present invention, an animator may store a plurality of face shapes, as illustrated in FIG. 2, in a database. A series of "neutral" faces, such as faces 200 and 202, which represent different face shapes is stored. A series of particular faces, such as faces 204, 206, 208 and 210, is also stored. To minimize storage, all of the faces 204, 206, 208 and 210, are stored solely as differences from the respective neutral faces 200 and 202, as will be further described below. For example, for face 204, only the mouth is stored since that is the only part of the face that is different from the face 200, which is a neutral face.

To form a new face, an animator may select from the database a number of faces with the desired characteristics and these faces will be blended with one another to create a new face with features that are a combination of the selected faces. The extent to which a selected face is incorporated into the new face may be selected by the animator by assigning each selected face with a weight. The new face is then a sum of the differences between each of the selected faces and the neutral face multiplied by their respective weights:

$$\sum_{i \in selectedfaces} w_i(P_i - P_{rest})$$

This formula is for each control point on the face and performed for all three Cartesian coordinates. The control points may represent a polygonal configuration or a bicubic patch representation.

In the preferred embodiment, for speed, the formula is applied to a polygonal representation. If a face was originally created with some other type of representation, such as bicubic patches, that other representation is converted into a polygonal representation for purposes of the blending as described above and the display for the animator, as will be described below. However, after an animator has created a desired animated face, the final animated scene, for use in a film or the like, is optimally generated by blending the original representation of the faces, and not the converted polygon representation, according to the weights selected by the animator.

Note that using unnormalized difference vectors, as in the above formula, compared with normalized absolute (non-difference) vectors is that adding an arbitrary number of local changes in the unnormalized difference vectors scheme will not affect the overall shape where the changes do not apply.

Figure 4A:
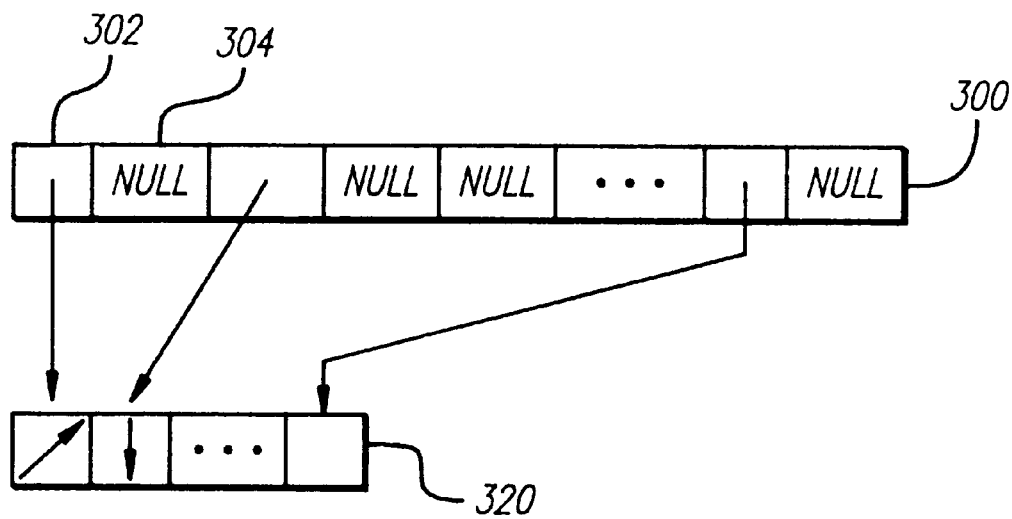
FIGS. 4a and 4b illustrate different methods for storing differences between a particular face and a neutral face.

The amount of storage occupied by the faces is minimized by selecting between two types of storage methods, depending upon which type minimizes the occupied memory. FIG. 4a illustrates one storage method. An array 300 includes an element for each vertex in a patch comprising part of a particular face. Some elements such as element 302, where each element corresponds to a particular vertex, store a pointer to a difference vector stored in a difference vector array 310. The difference vector array 310 includes a difference vector comprising the difference between a vertex of the particular face and the corresponding vertex of neutral face.

However, for those elements such as element 304 that correspond to vertices that are unchanged from the neutral face, a NULL pointer is stored in the array 300. For particular faces that have a large number of vertices unchanged from the neutral face, the storage method illustrated in FIG. 4a will prove efficient since memory is not unnecessarily set aside for difference vectors where there is, in fact, no difference between the vertex of the neutral face and the corresponding vertex of the particular face.

Figure 4B:
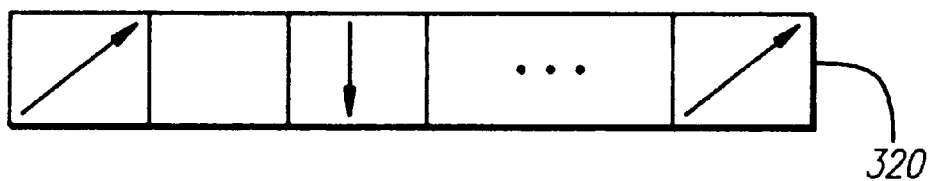

However, for particular faces where most of the vertices are changed from the neutral face, the storage method illustrated in FIG. 4b will be preferable. As shown, an array 320, with an element for each vertex in a patch, directly stores a difference vector between a vertex of the particular face and the corresponding vertex of neutral face. Memory for difference vectors is set aside for those vertices where there is in fact, no difference between the vertex of the neutral face and the corresponding vertex of the particular face. However, if there are only a few such non-zero differences, this amount of unnecessarily set aside memory will be smaller than the amount of memory required by the array 300 illustrated in FIG. 4a. For a particular face, either the method illustrated in FIG. 4a or the method illustrated in FIG. 4b is selected, depending upon which method will result in a minimum occupation of storage.

As will be described more fully below, a graphical user interface provides the animator with a plurality of slide bars that have elements that may be moved to correspond to the desired weight. Each weight may be animated, that is changed according to time. When a weight curve is modified, only the frames affected by the change are reblended.

Display

In the preferred embodiment, the faces are created and stored as a mesh of bicubic patches. To increase the speed of the display, the patches are converted to a polygonal mesh. The polygonal mesh is then rendered and displayed. As previously described, speed may be increased by displaying in a low resolution mode only a subset of the vertices comprising a face. In the preferred embodiment, the even numbered vertices are skipped for each two dimensional patch comprising a face. This results in ¼ of vertices being displayed which results in a faster display.

Graphical User Interface

Figure 3:
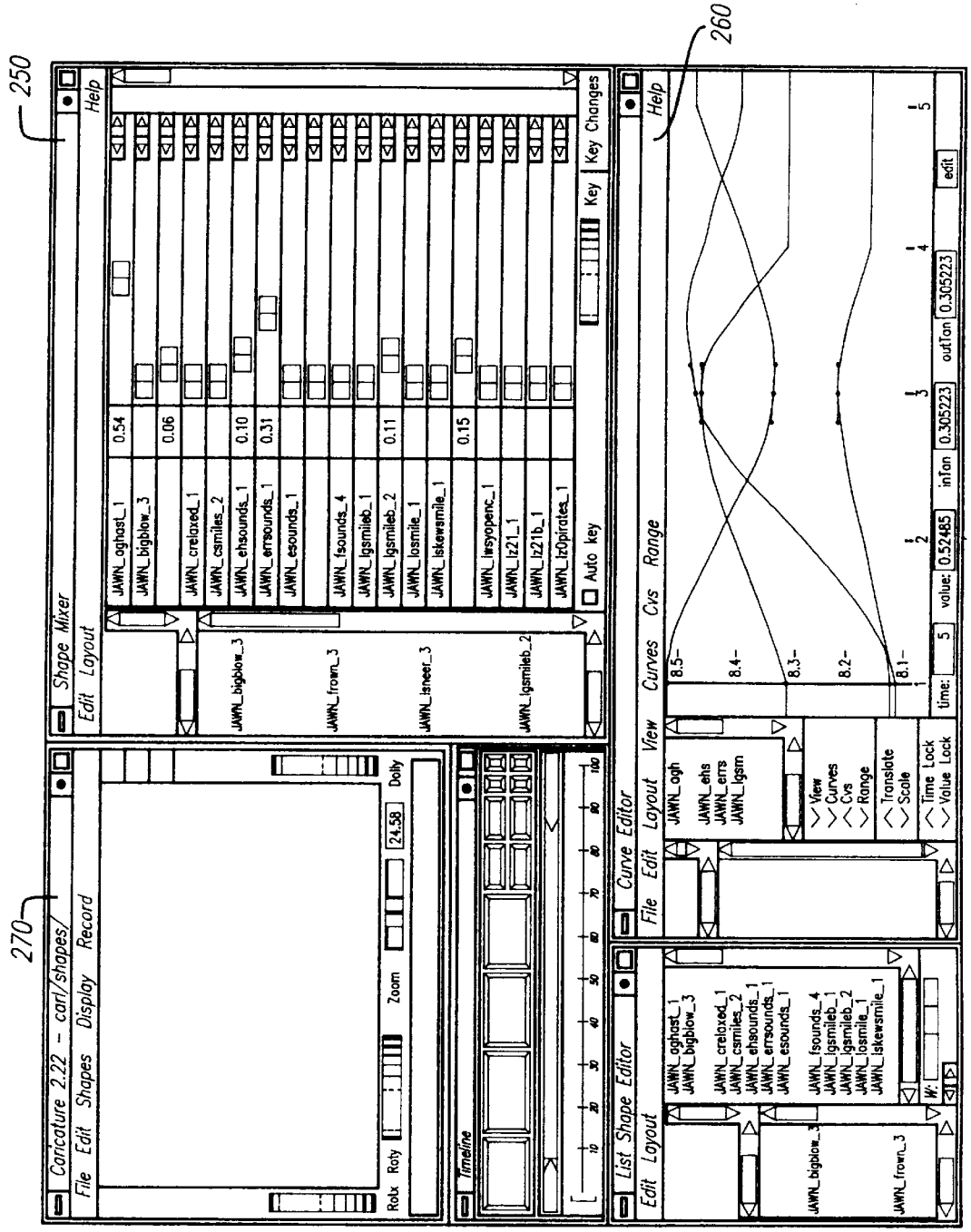
FIG. 3 illustrates a preferred graphical user interface according to the teachings of the present invention.

The present invention includes an improved user interface for providing an animator with the ability to animate a complex facial object. FIG. 3 illustrates a preferred graphical user interface according to the teachings of the present invention.

The graphical user interface includes a plurality of slide bars, such as slide bar 250, that indicate the weight that will be assigned to a particular face in the database for a particular frame. As previously described, the desired face for a particular frame, as illustrated in a window 270 of FIG. 3, comprises the sum of the selected faces multiplied by their respective weights.

The graphical user interface of the present invention includes a window 260 that includes user alterable curves that represent how a weight changes over time. In addition to adjusting the weights with the slide bars, an animator may adjust a weight by selecting a point on one of the curves in the window 260 and moving the point. The results of the adjustment will be rapidly displayed in the window 270.

Other Variations

Detailed illustrations and preferred embodiments of computer graphics methods and apparatus in accordance with the present invention have been provided above for the edification of those of ordinary skill in the art, and not as a limitation on the scope of the invention. Numerous variations and modifications within the spirit of the present invention will of course occur to those of ordinary skill in the art in view of the preferred embodiments that have been disclosed herein. Such variations, as well as any other systems embodying any of the following claims, all remain within the scope of the present invention:

I claim:

1. A method of creating a new animation object comprising: selectively combining weighted object data from a database of different objects, wherein selectively combining weighted object data from a database of different objects further comprises;

converting each selected object to a polygonal representation, each polygon having a plurality of vertices;

blending selected polygonal representations to form a composite polygonal object, the contribution of each polygonal representation depends on the weight data assigned to the polygonal representation;

displaying a sequence of frames containing the new animation object;

changing the weighting of one or more of the different objects; and displaying the sequence of frames containing the new animation object with altered weightings, wherein displaying the sequence of frames containing the new animation object with altered weightings further comprises;

blending selected objects to form the desired object, the contribution of each object depends on the weight data assigned to the corresponding polygonal representation; and generating a final sequence of animation frames using the desired object.

2. The method of claim 1 further comprising:

display the polygonal representation of each selected object and the composite polygonal object in a low resolution mode.

3. The method of claim 2 wherein displaying the polygonal representation of each selected object and the composite polygonal object in a low resolution mode further comprises:

displaying a subset of the vertices of each selected object and the composite polygonal object in a low resolution mode.

4. The method of claim 3 wherein displaying a subset of the vertices of each selected object and the composite polygonal object in a low resolution mode further comprises:

displaying odd numbered vertices of each selected object and the composite polygonal object in a low resolution mode.

5. The method of claim 3 wherein displaying a subset of the vertices of each selected object and the composite polygonal object in a low resolution mode further comprises:

displaying even numbered vertices of each selected object and the composite polygonal object in a low resolution mode.

* * * * *